US00RE35386E

United States Patent [19]

Wu et al.

[11] E Patent Number: Re. 35,386

[45] Reissued Date of Patent: Dec. 3, 1996

[54] METHOD FOR DRILLING DIRECTIONAL WELLS

[75] Inventors: Jian-Qun Wu, Houston; Macmillan M. Wisler, Kingwood, both of Tex.

[73] Assignee: Baker Hughes Incorporated, Houston, Tex.

[21] Appl. No.: 290,195

[22] Filed: Aug. 15, 1994

Related U.S. Patent Documents

Reissue of:

[64] Patent No.: 5,230,386
Issued: Jul. 27, 1993
Appl. No.: 715,417
Filed: Jun. 14, 1991

[51] Int. Cl.[6] ..... E21B 7/04

[52] U.S. Cl. ..... 175/45; 175/61; 175/62; 324/338; 324/369

[58] Field of Search ..... 175/45, 61, 62; 324/338, 369

[56] References Cited

U.S. PATENT DOCUMENTS

| | | | |
|---|---|---|---|
| 3,823,787 | 7/1974 | Haworth et al. | 175/24 |
| 3,907,045 | 9/1975 | Dahl et al. | 175/45 |
| 3,982,431 | 9/1976 | Grosso et al. | 73/151 |
| 4,013,945 | 3/1977 | Grosso | 324/173 X |
| 4,021,774 | 5/1977 | Asmundsson et al. | 175/45 X |
| 4,601,353 | 7/1986 | Schuh et al. | 175/41 |
| 4,786,874 | 11/1988 | Grosso et al. | 175/45 X |
| 4,899,112 | 2/1990 | Clark et al. | 324/338 |
| 4,905,774 | 3/1990 | Wittrisch | 175/61 X |
| 4,980,643 | 12/1990 | Gianzero et al. | 324/339 |
| 5,001,675 | 3/1991 | Woodward | 367/13 |
| 5,038,108 | 8/1991 | Lessi et al. | 324/355 |
| 5,045,795 | 9/1991 | Gianzero et al. | 324/342 |

FOREIGN PATENT DOCUMENTS

| | | |
|---|---|---|
| 327422 | 8/1989 | France . |
| 2194345 | 3/1988 | United Kingdom . |

OTHER PUBLICATIONS

"Logging While Drilling Keeps Horizontal Well on Small Target", Oil and Gas Journal Oct. 23, 1991.

"Bed Boundary Detection Using Resistivity Sensor in Drilling Horizontal Wells", Annual Logging Symposium, Jun. 16–19, 1991.

"Features of Logging–While–Drilling (LWD) in Horizontal Wells", SPE/IADC, Mar. 11–13, 1991.

Gianzero et al., "Induction, Resistivity, and MWD Tools in Horizontal Wells", May 1990, pp. 158–171.

Anderson et al., "Response of 2–MHz LWD Resistivity and Wireline Induction Tools in Dipping Beds and Laminated Formations", Jun. 1990, pp. 1–25.

Huang et al., "Computation of Induction Logs in Multiple-Layer Dipping Formation", IEEE Trans. on Geoscience and Remote Sensing. vol. 27, No.3 (1989), pp. 259–267.

Wisler, "Real–Time Electromagnetic Propagation Resistivity and Memory For MWD", Technical Paper—11th European Formation Evaluation Symposium, Sep. 1988.

(List continued on next page.)

*Primary Examiner*—Hoang C. Dang
*Attorney, Agent, or Firm*—Fishman, Dionne & Cantor

[57] ABSTRACT

A method for detecting and sensing boundaries between strata in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum.

61 Claims, 8 Drawing Sheets

OTHER PUBLICATIONS

Anderson et al., "Effects of Dipping Beds on the Response of Induction Tools", Society of Petroleum Engineers, Oct. 1986.

Barber et al., "Correcting the Induction Log for Dip Effect", Society of Petroleum Engineers, Oct. 1989.

Clark et al., "A Dual Depth Resistivity Measurement for FEWD", SPWLA Twenty–Ninth Annual Logging Symposium, Jun. 1988.

Allen et al., "Integration of Wireline Resistivity Data With Dual Depth of Investigation 2–MHz MWD Resistivity Data", SPWLA Thirtieth Annual Logging Symposium, Jun. 1989.

METHOD FOR DRILLING DIRECTIONAL WELLS

Matter enclosed in heavy brackets [ ] appears in the original patent but forms no part of this reissue specification; matter printed in italics indicates the additions made by reissue.

BACKGROUND OF THE INVENTION

This invention relates generally to borehole formation evaluation instrumentation and methods of using such instrumentation in the drilling of directional wells. More particularly, this invention relates to a method for measuring the position of a drillstring while drilling a horizontal borehole and maintaining the drillstring within desired boundaries using electromagnetic propagation based earth formation evaluation tools.

Borehole formation evaluation tools are known which measure phase and/or amplitude of electromagnetic waves to determine an electrical property (such as resistivity or permitivity) of a section of a borehole. Typically, the existing tools used for this application are composed of one or more transmitting antennas spaced from one or more pairs of receiving antennas. An electromagnetic wave is propagated from the transmitting antenna into the formation surrounding the borehole and is detected as it passes by the two receiving antennas. In a resistivity measuring tool, magnetic dipoles are employed which operate in the mf and lower hf spectrum. In contrast, permitivity tools utilize electric dipoles in the VHF or UHF and microwave ranges.

In a known resistivity sensor of the type hereinabove discussed which is used by Teleco Oilfield Services, Inc., assignee of the present application, the resistivity sensor measures both phase difference and amplitude ratio to provide two resistivities with different depths of investigation. A signal received in a first (far) receiving antenna is shifted in phase and its amplitude will be less than the signal received in a second (near) receiving antenna. Resistivities are then derived from both the phase difference ($R_{pd}$) and the amplitude ratio ($R_{ar}$) of the received signals. The differential measurement is primarily responsive to the formation opposite the receiving antennas and is less sensitive to the borehole and/or variations in the transmitted signal as in prior art sensing devices. An example of a formation evaluation instrument of this type is described in FIGS. 1 and 2 of U.S. Pat. No. 5,001,675 which is assigned to the assignee hereof and fully incorporated herein by reference. The formation evaluation tool acquires the resistivity data in real time and then transmits this information to the drilling operator using any suitable measurement-while-drilling transmission technique such as mud pulse telemetry (see U.S. Pat. Nos. 3,982,431, 4,013,945 and 4,021,774) or the information is stored downhole for review after retrieval of the tool.

In drilling a horizontal well, the goal is to drill the well in such a way that the well stays within the pay zone (i.e., a selected bed or stratum) for as long as possible in order to achieve a higher recovery rate. Before drilling a horizontal well, a course of drilling is planned based on knowledge about the pay zone and the boundaries between the pay zone and its neighboring beds. Because of the uncertainties in the knowledge about the bed boundaries and the errors in directional drilling, the well being drilled often can not stay in the pay zone as desired. It is, therefore, very important to know the relative position of the drill bit and the well with respect to the bed boundary in real time so that when the well is very close to the bed boundary, proper action is taken, ensuring that the well will stay within the pay zone.

SUMMARY OF THE INVENTION

The above-discussed and other drawbacks and deficiencies of the prior art are overcome or alleviated by the method for drilling directional wells (e.g., horizontal wells) of the present invention. In accordance with the present invention, this drilling method comprises drilling a substantially vertical well (generally referred to as an offset well) and generating a first log of resistivity as a function of depth or, as will be discussed later, an assumed log is generated from knowledge other than a vertical well. Using any one of a number of known dipping bed modeling techniques, this first log is then modeled to provide a second log which is indicative of resistivity of a selected bed (or stratum) along a horizontal or substantially horizontal direction. A directional well (a second well or borehole) is then drilled near the offset well. The directional well is initially vertical and turns substantially horizontal in the substantially horizontal (previously selected) bed. A measurement-while-drilling (MWD) electromagnetic propagation tool is employed during the directional drilling to provide a third log (i.e., a horizontal log) while drilling (e.g., in real time). The third log is compared to the second log (i.e. the modeled horizontal log) so that the location of the drillstring (and therefore the horizontal well) can be determined and the direction of drilling corrected or adjusted accordingly so that the drillstring is maintained within the desired stratum.

Bed boundaries (i.e., where adjacent beds meet) cause three distinct features (i.e., separation, dips and horns) in the horizontal logs. In accordance with the above-described method of this invention, these features can be used to detect the presence of the bed boundaries in drilling horizontal or nearly horizontal wells (i.e., the directional well).

In another embodiment of this invention, no initial vertical well is drilled. Instead, assumptions are made about the resistivities of the vertical strata from other information such as geological knowledge of the area or siesmic measurements. These assumed resistivities are used in the aforementioned dipping bed model to generate the modeled log of the substantially horizontal stratum. Thereafter, as in the first embodiment, the real time resistivity log of the directional well is compared to the modeled log to correct or adjust the drilling operation so as to maintain the drillstring within a desired substantially horizontal stratum.

Modeling can also be carried out on site with the position of the resistivity tool relative to the bed boundary as an input to the model. The tool's position relative to the bed boundaries is varied in the model calculations until the real time resistivity log is reproduced. By so doing, the tool's Position, and therefore the drill bit and well relative to the bed, is determined.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES:

FIG. 4A shows resistivity as the tool travels into and out of a 50 ohm-meter bed in a vertical well (0 degree dipping angle) FIG. 4B shows resistivity as the tool travels into and out of the 50 ohm-meter bed at a 45 degree dipping angle, FIG. 4C shows resistivity as the tool travels into and out of the 50 ohm-meter bed at a 60 degree dipping angle, FIG. 4D shows resistivity as the tool travels into and out of the 50 ohm-meter bed at a 75 degree dipping angle, and FIG. 4E shows resistivity as the tool travels into and out of the 50 ohm-meter bed at a 90 degree dipping angle (horizontal well);

DESCRIPTION OF THE PREFERRED EMBODIMENT

Naturally formed geological bed boundaries are not necessarily horizontal and may not be perfect planes. During directional drilling (i.e., horizontal drilling), a predetermined course of drilling cannot ensure that the well being drilled stays in the producing bed. Thus, an important concern in horizontal drilling is early detection of the bed boundary so that the well can be maintained in the hydrocarbon producing bed.

Figure 1:
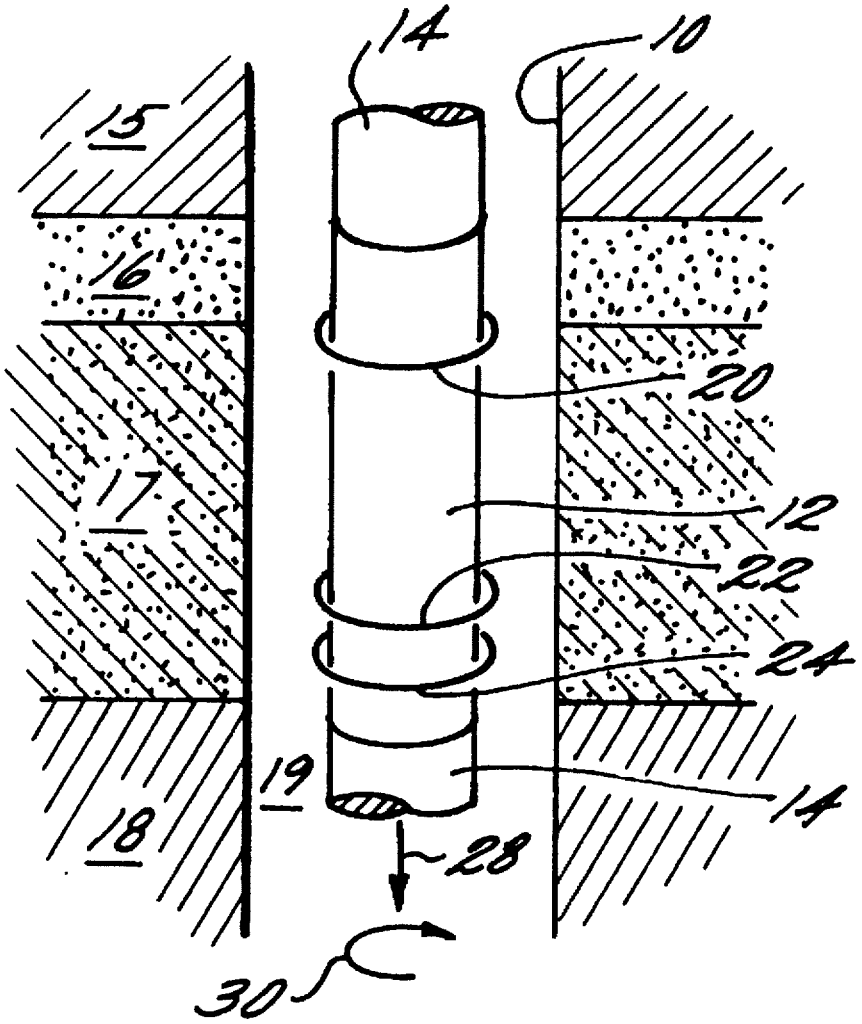
FIG. 1 is front elevation view, partly in cross section, of a portion of an electromagnetic propagation resistivity tool in a substantially vertical borehole.

Referring to FIG. 1, a substantially vertical well 10 (i.e., borehole or dipping bed) is drilled near a desired well location in accordance with well known methods. Well 10 is a vertical offset well from which formation resistivity information is initially collected (i.e., a log). An electromagnetic propagation resistivity tool 12 (generally incorporated into a drill string 14 for measurement-while-drilling) is shown disposed in well 10. Tool 12 is typically two MHz. Well 10 extends across several formations identified at 15, 16, 17 and 18. Well 10 has drilling fluid 19 flowing therein. Tool 12 includes a transmitter antenna 20, a near receiver antenna 22 and a far receiver antenna 24. In this example, the distances between transmitter antenna 20 and near and far receiver antennas 22,24 are 27.5 and 34.5 inches, respectively. Antennas 20, 22 and 24 are disposed on a drill collar which houses the electronics for transmitting a electromagnetic wave by antenna 20 to be detected by antennas 22 and 24. Tool 12 is known in the art and described in FIG. 1 of aformentioned U.S. Pat. No. 5,001,675.

In accordance with a first embodiment of the method of this invention, resistivity as a function of depth is logged by tool 12 so that the resistivities in the formations 15–18 and the bed boundaries which separate them can be determined. This resistivity measurement is then used in dipping bed modeling to approximate the response of tool 12 during horizontal drilling. As will be discussed with reference to FIG. 2, during actual drilling of horizontal or near horizontal wells using a drillstring which incorporates tool 12, resistivity readings from tool 12 are compared to the model and used to detect bed boundaries in horizontal and near horizontal wells. Based on these comparisons, adjustments to the directional drilling operations can be made to maintain the drillstring within a desired pay zone or stratum.

The model approximates the antennas 20, 22, 24 as dipoles (the steel drill string 14 and borehole effects are not included). The dipole approximation provides a good approximation except when the tool is within a few inches of a bed boundary (e.g., between strata 17 and 18) and the dipping angle is large (as described hereinafter). There are different, well known methods which can be used to carry out dipping bed model calculations. In the following example, the model described in an article entitled "Computation of Induction Logs in Multiple-Layer Dipping Formation", IEEE Trans. on Geoscience and Remote Sensing, Vol. 27, No. 3 (1989), p. 259, by Ming Huang and Liang C. Shen is used, the entire contents of which is incorporated herein by reference.

Figure 2:
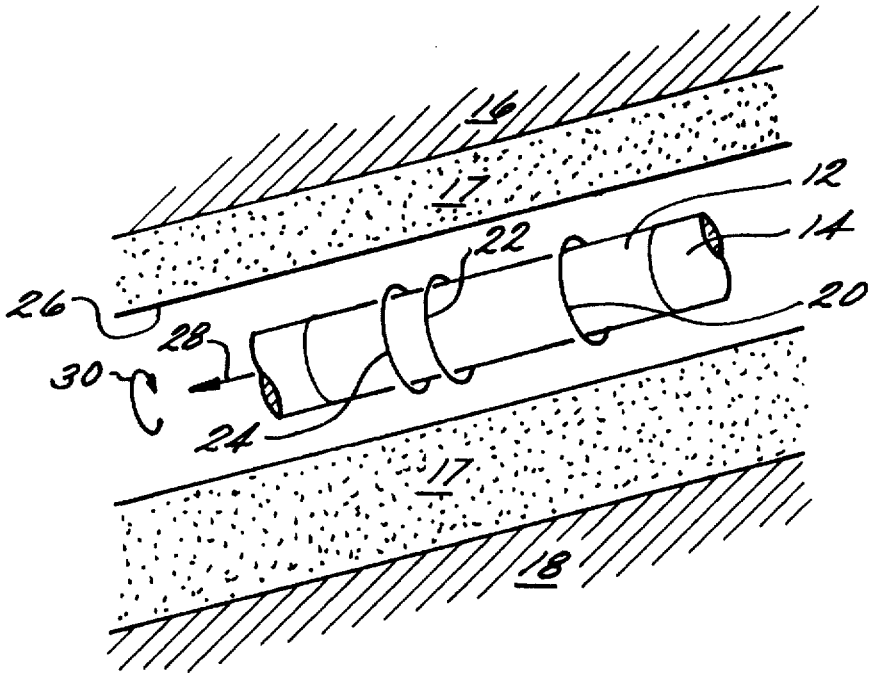
FIG. 2 is a front elevation view, partly in cross section, of the electromagnetic propagation resistivity tool in a substantially horizontal portion of a directional borehole.
Figure 2A:
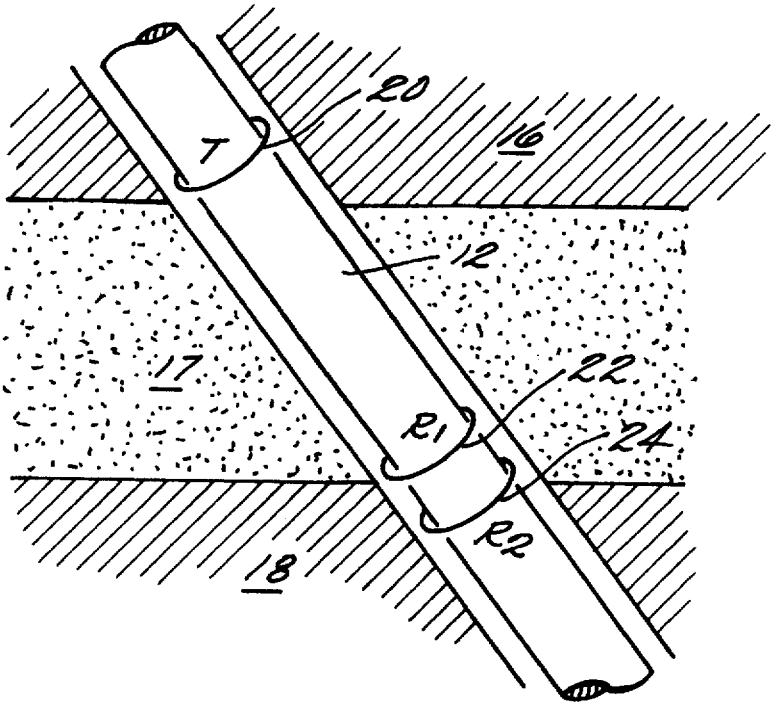
FIG. 2A is a schematic diagram of an electromagnetic propagation resistivity tool shown passing through several bed boundaries at a selected dipping angle.

Referring now to FIG. 2, a second well or borehole 26 (i.e., a directional well) is drilled which is initially vertical and is thereafter directed generally horizontally into a pay zone (i.e., hydrocarbon producing bed 17) selected from the the offset well 10 resistivity log or otherwise. By comparing the modeled tool response to the real time tool response during horizontal drilling, it can be determined approximately where in well 26 the tool 12' is, and thereby the location of the borehole. The direction of drilling is shown by arrow 28. Based on this comparison, the drilling operator can adjust and/or correct the directional drilling operations to maintain the drilling in a desired stratum. 2A is a diagrammatic view of the direction well at any angle θ with FIG. 2 being the special case where θ equals 90 degrees.

EXAMPLES

Figure 3:
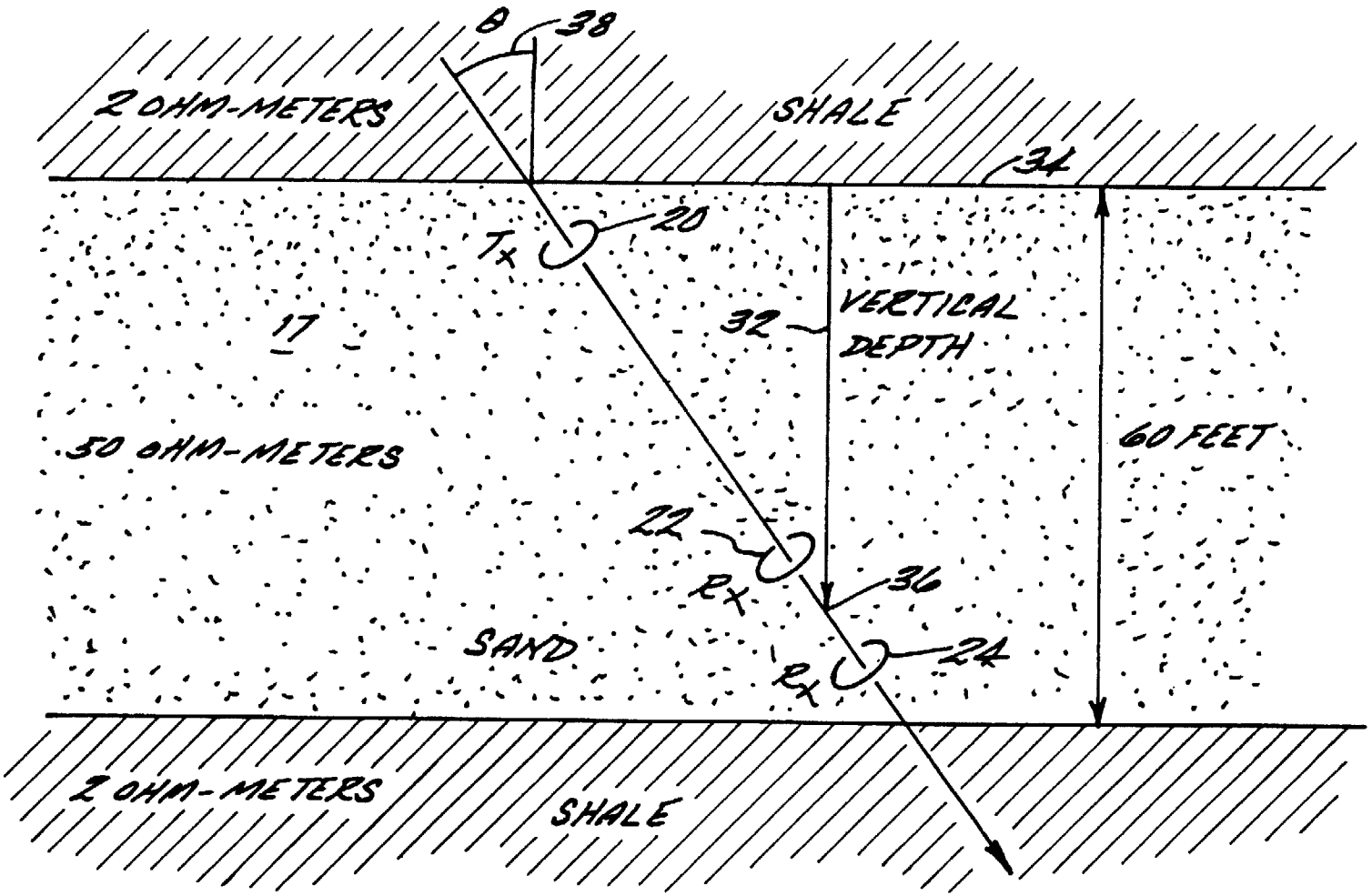
FIG. 3 is a schematic diagram of the electromagnetic propagation resistivity tool in the directional well of FIG. 2A.

In this example the thickness of the hydrocarbon producing bed 17 is 60 feet. Bed 17 and the shoulder resistivities are 50 and 2 ohm-meters, respectively. A schematic plot of the formation geometry and the tool is shown in FIG. 3. The true vertical depth 32 is defined as the distance between the upper bed boundary 34 and the midpoint between the two receiver antennas 36 (the tool measure point). A negative true vertical depth means that the midpoint is in the upper shoulder bed. In the following, the distance between the tool and the bed boundary is the magnitude of the true vertical depth.

Figure 4A:
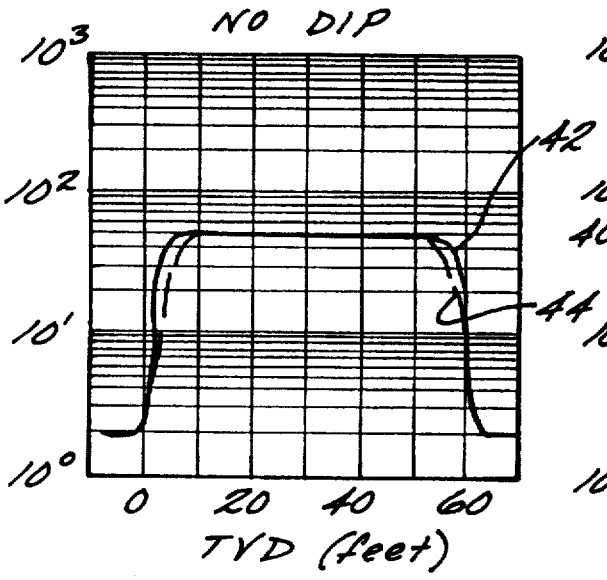
FIGS. 4A–4E are charts showing the phase difference resistivity and amplitude ratio resistivity of the electromagnetic propagation resistivity tool in the directional borehole of FIG. 2A.
Figure 4C:
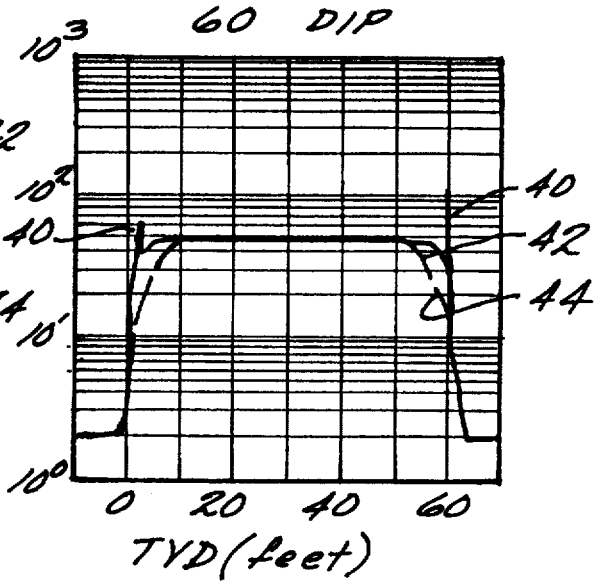
Figure 4B:
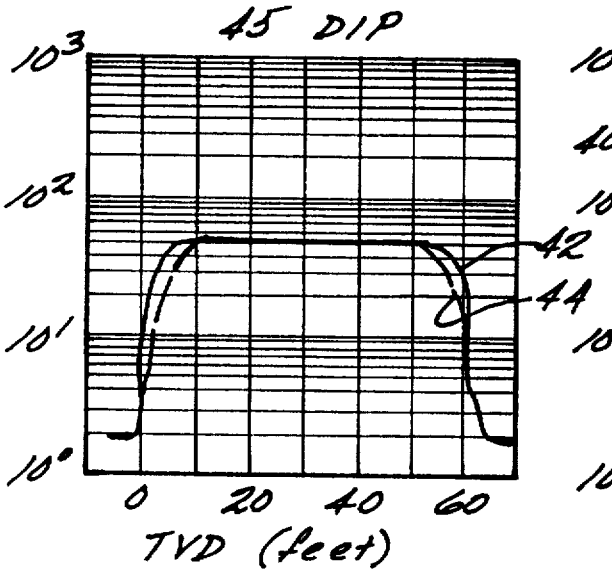
Figure 4D:
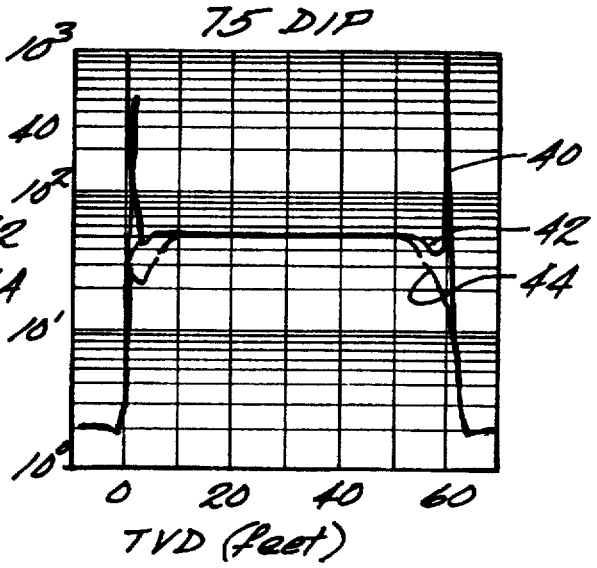
Figure 4E:
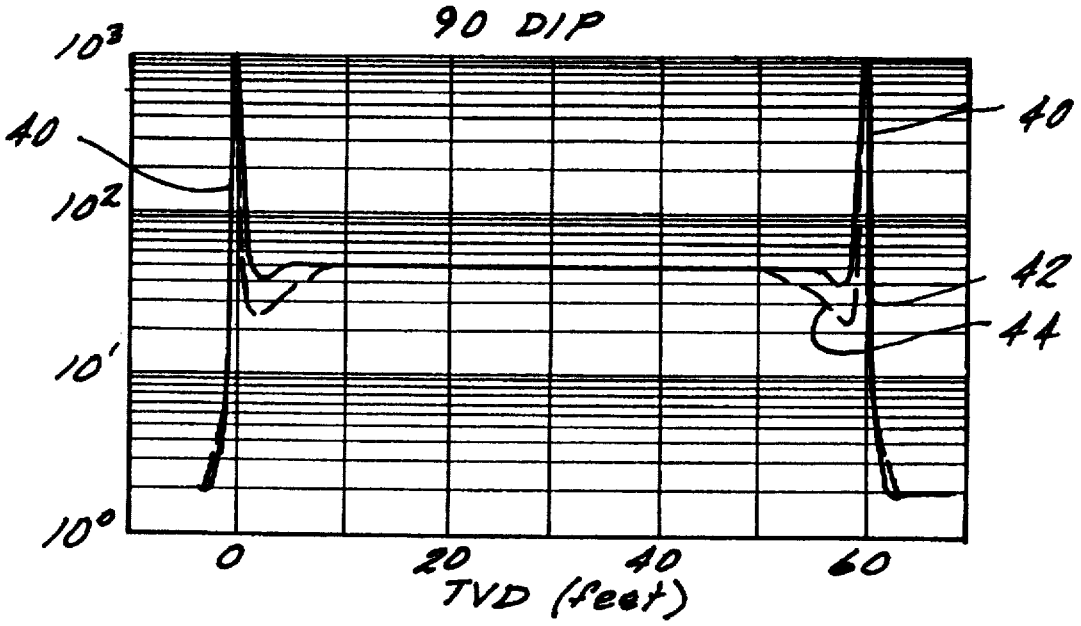

Referring to FIGS. 4A–4E, apparent resistivities are plotted as functions of vertical depth for 0, 45, 60, 75, and 90 degree dipping angles, respectively. Dipping angle 38 (FIG. 3) is defined as the angle between the borehole and the perpendicular to the bedding plane. On a vertical depth plot, the effect of dipping is negligible for dipping angles from 0 degrees up to about 45 degrees (FIG. 4A and 4B). At about 60 degrees (FIG. 4C), horns 40 in apparent resistivities (i.e., phase difference resistivity and amplitude ratio resistivity) appear around the bed boundaries. Horns 40 are produced by the interference between the electromagnetic wave generated by the transmitter antenna 20 as well as the bulk eddy currents and the electromagnetic wave generated by the surface charges on the bed boundary caused by the discontinuity. A solid line 42 represents phase difference resistivity and a dashed line 44 represent amplitude ratio resistivity. As the dipping angle 38 increases, the horns 40 become more pronounced (e.g., at 75 degrees, FIG. 4D). Near 90 degrees (FIG. 4E), the values of horns 40 are off scale and the width of the phase resistivity horn is about 1.5 feet. Near 90 degrees, the response does not change very much with the dipping angle. For example, the response at 85 degrees is almost identical to that of 90 degrees as functions of true vertical depth. In horizontal well 26 inside a relatively resistive bed, the phase difference resistivity readings drop when the tool is about 4 feet away from the conductive boundary and then rise drastically as the tool approaches the bed boundary. Phase and amplitude resistivities separate when the tool is about 10 feet away from the boundary. The separation becomes significant when the distance between the tool and the boundary is 6 feet.

In this particular example, three features can be used to detect a conductive bed boundary is a horizontal well; resistivity horns 40; resistivity drops; and phase and amplitude resistivity separation. The phase resistivity horns 40 are detectable when the tool is about 1 foot away from the bed boundary. The resistivity drops can identify the bed boundary presence when tools are about 4 feet away. Bed boundaries cause a significant phase and amplitude resistivity separation when tools are up to 6 feet away.

The phase and amplitude resistivity separation feature are preferred to identify the bed boundary since it provides the earliest detection. When the tool 12 is 6.5 feet away from the bed boundary, the separation between the phase and amplitude resistivities is about 20 percent of the true bed resistivity. If the phase and the amplitude resistivity separation caused by other factors (e.g., invasion, tool eccentering or dielectric effects) is less than 20 percent, the bed boundary can be detected when the boundary is 6.5 feet away. At 87 or 93 degree dipping angle, 6.5 foot vertical depth corresponds to 130 feet in measured hole depth. If 30 percent separation criteria is used, the bed boundary can be detected when the tool is 5 feet away from the boundary. In practice, however, many factors may cause phase and amplitude resistivity separations. Amplitude resistivity readings of tool 12 may not be reliable at very high resistivities. Therefore, separation of phase and amplitude curves can provide early bed boundary detection in a limited number of situations.

When amplitude resistivity readings are not reliable, the phase resistivity drop feature is preferred for the detection of conductive bed boundaries. The phase resistivity is 8 percent lower than the bed resistivity if the tool is 4 feet away from the bed boundary. If 20 percent drop criteria is used, the bed boundary can be identified when tool 12 is 2.5 feet away. At 87 or 93 degrees. 2.5 feet in vertical depth corresponds to 50 feet in measured depth. If the drill bit is 20 feet ahead of the tool, the bed boundary can be detected when the drill bit is 1 foot away from the bed boundary.

The horns in resistivity readings provide the most unambiguous signature of the bed boundary presence since no other known physical effect can produce a horn of this magnitude in apparent resistivity readings. However, the tool has to be about 1.5 feet or closer to the bed boundary to detect these horns. In most cases, when a horn 40 shows up in the resistivity log, the drill bit has already crossed the boundary. In situations where the penalty for the bit's crossing the bed boundary is small or none, horns 40 can be used as the bed boundary detector. In any case, horns 40 on resistivity logs signify with certainty the presence of a bed boundary.

Figure 5:
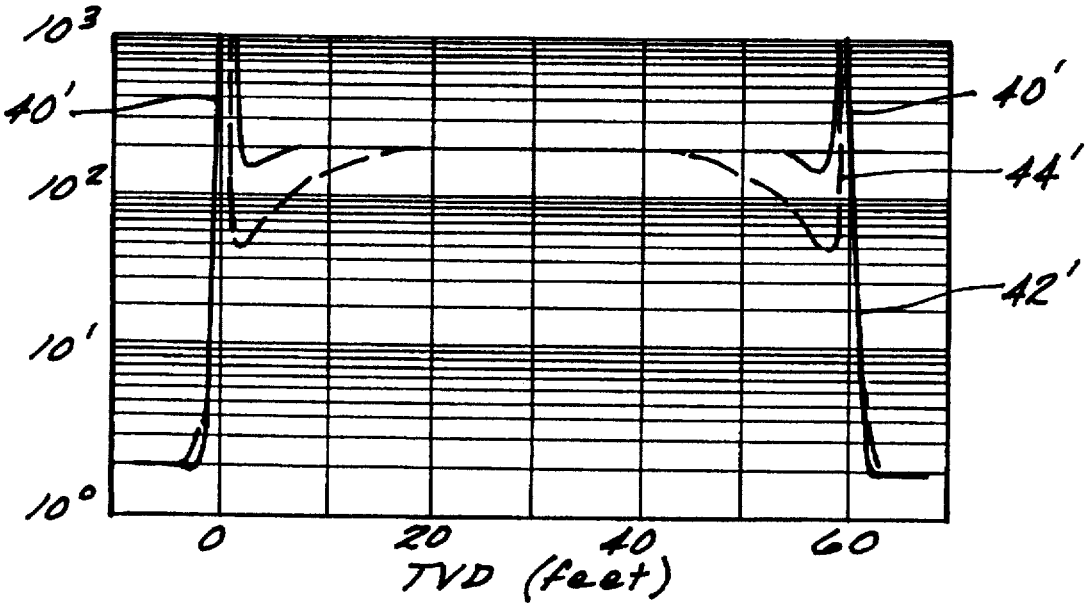
FIG. 5 is a modeled response of phase difference resistivity and amplitude ratio resistivity of the electromagnetic propagation resistivity tool of FIG. 2A in a 200 ohm-meter bed at a 90 degree dip angle.

In a second example similar to the first example, the bed thickness and the shoulder resistivity are same as those of the first example. The bed resistivity is 200 ohm-meters. In FIG. 5, phase and amplitude resistivities 42',44' are plotted as functions of true vertical depth. The dipping angle is 90 degrees. The three features are similar to those in the first example (FIGS. 4A–D) with only quantitative differences. The Phase and amplitude resistivity separation is 20 percent of the bed resistivity when the tool is 12 feet from the boundary. At 10 feet the separation is 30 percent. The phase resistivity drop is 20 percent at 4 feet. The horn width is about the same as that in the first example.

Therefore horns, resistivity drops, and phase and amplitude resistivity separations can be used to detect the presence of a bed boundary. It will be appreciated that this method of maintaining a directional borehole in a bed (i.e., detection of bed boundaries) can be employed without the offset well and, thus without the vertical resistivity logs for comparison. The horns provide the most reliable detection, but the tool has to be about 1.5 feet from the boundary. The phase and amplitude resistivity separation feature can detect the boundary from a relatively large distance. This feature can not be used when other factors cause large phase and amplitude resistivity separations or when the amplitude resistivity readings are not reliable.

FIELD TEST

Figure 6:
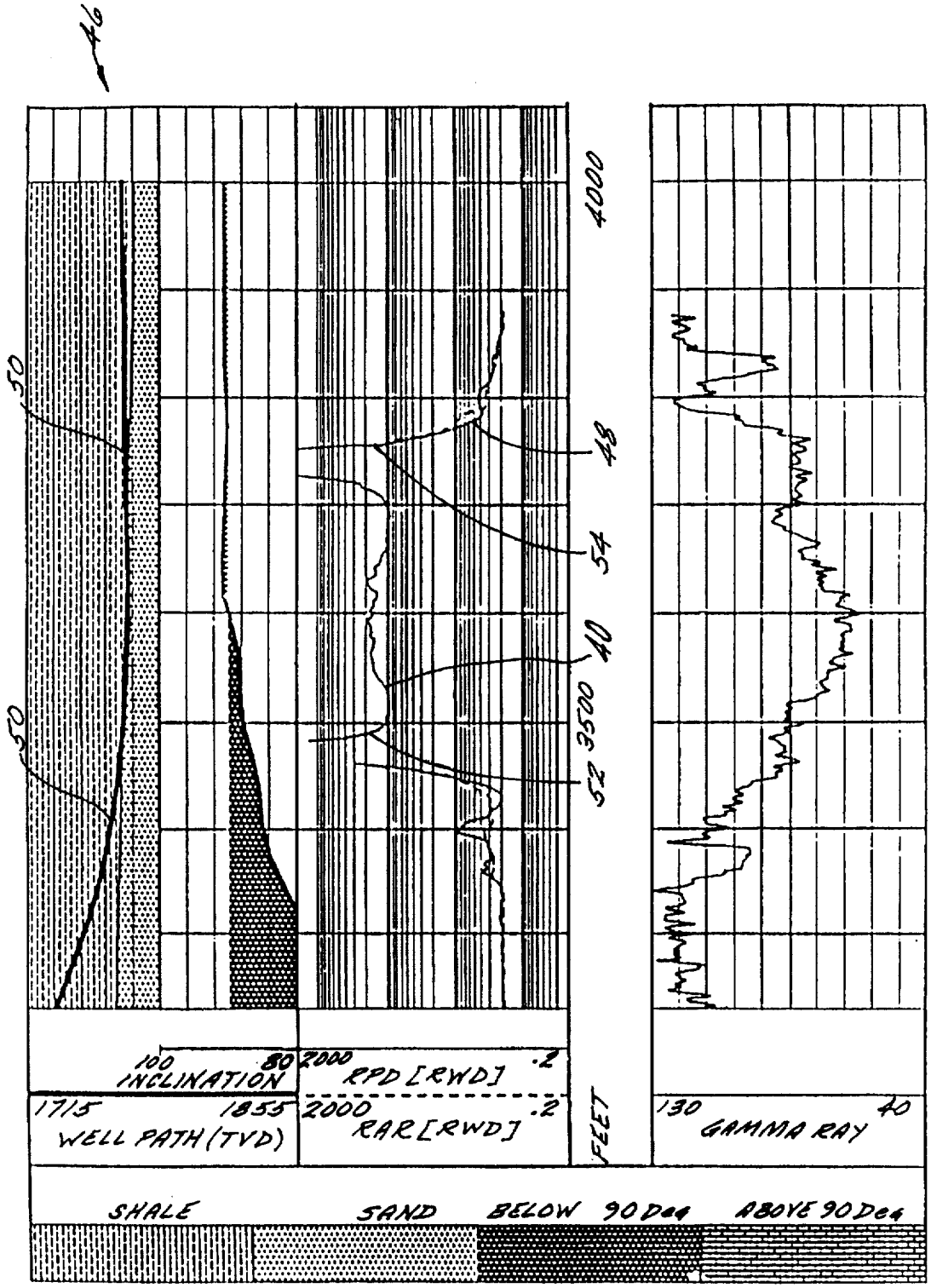
FIG. 6 is a log chart of a first experimental directional well in accordance with the present invention.

Referring to FIG. 6, in a first field test, a wireline induction log 46 of a vertical well (in accordance with a first step of the method of this invention and corresponding to the vertical drilling shown in FIG. 1) indicates that there is a 60 foot thick gas producing sand bed located at about 1700 feet below the sea level. The upper shoulder is shale whose resistivity is about 2 ohm-meters. The lower shoulder is a water and sand stratum with a resistivity of 0.6 ohm-meters. The induction resistivity in the bed varies significantly. The average is about 50 ohm-meters, without shoulder bed effect correction. The bed is not completely horizontal, but the dip is at most a few degrees.

In order to avoid water coning, it is desired that the horizontal wells should stay in the top third of the producing bed. In drilling the horizontal portions of the wells, 2 MHz electromagnetic resistivity MWD tools of the type described with reference to U.S. Pat. No. 5,001,675 are used.

Resistivity log 46 shows phase difference resistivity (RPD), amplitude ratio resistivity (RAR), true vertical depth (TVD), natural gamma ray, and inclination are plotted as a function of measured hole depth. Two horns are present on the phase resistivity curve 48. From the vertical depth reading, one can see that both horns indicate the upper bed boundary crossing at 40. The first horn 52 signifies the tool entering into the pay bed from the upper shoulder. The second horn 54 shows the tool leaving the bed and entering the upper shoulder. Unfortunately, since 200 ohm-meters is above the range of the amplitude ratio resistivity measurement, the phase and amplitude resistivity separation feature can not be seen. The phase resistivity drop feature is present. Since the phase resistivity reading in the bed fluctuates somewhat, one must be cautious when using the phase resistivity drop feature to detect the bed boundary in situations like this.

Figure 7:
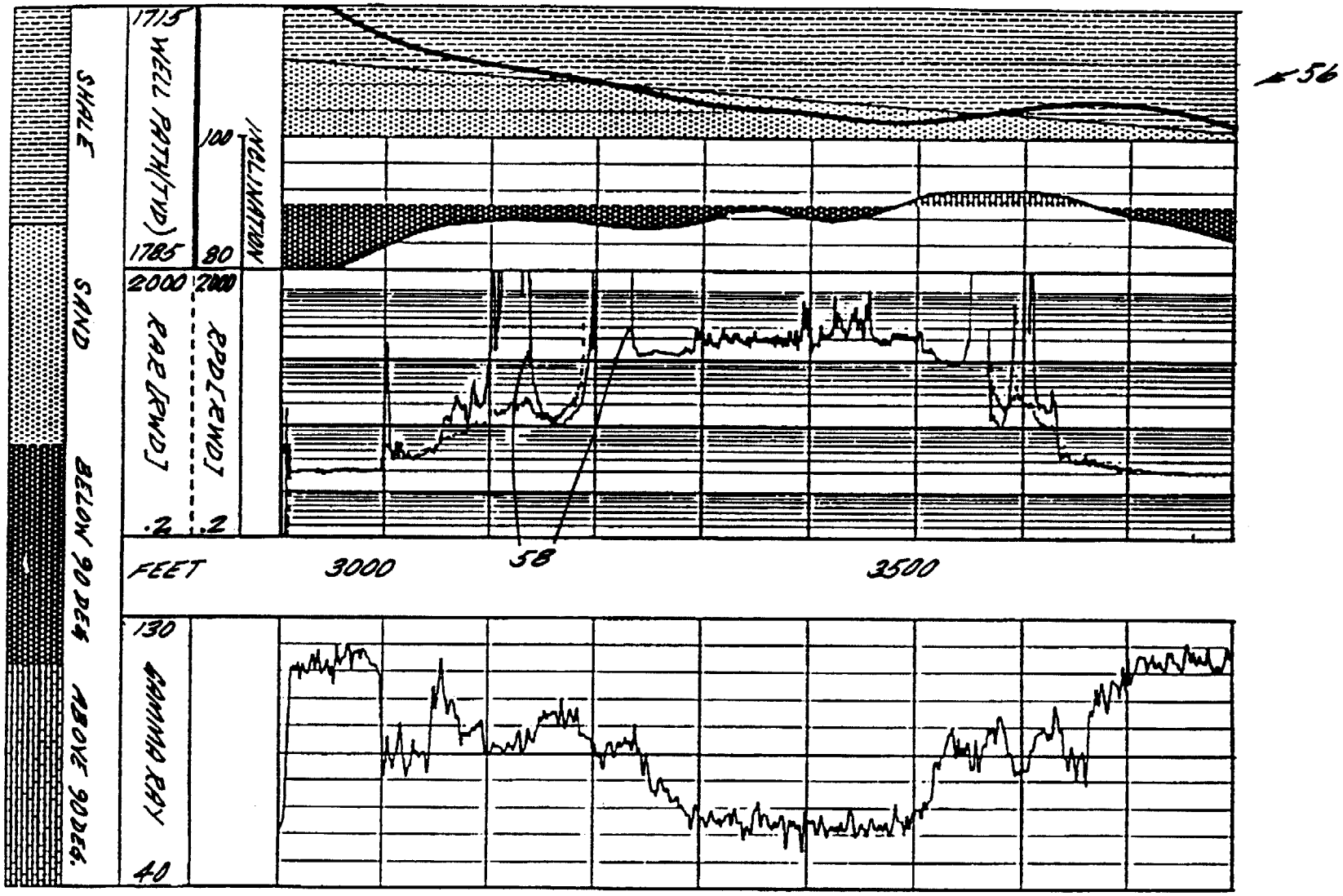
FIG. 7 is a log chart of a second experimental directional well in accordance with the present invention.

Referring to FIG. 7, a log 56 from a second field test is shown. As in the previous well log (FIG. 6), the tool entered the bed from the upper shoulder and again exited the bed into the upper shoulder. Two horns 58 appear when the tool crosses the upper bed boundary. The double horns are likely caused by another layer of sand in the upper shoulder.

Figure 8:
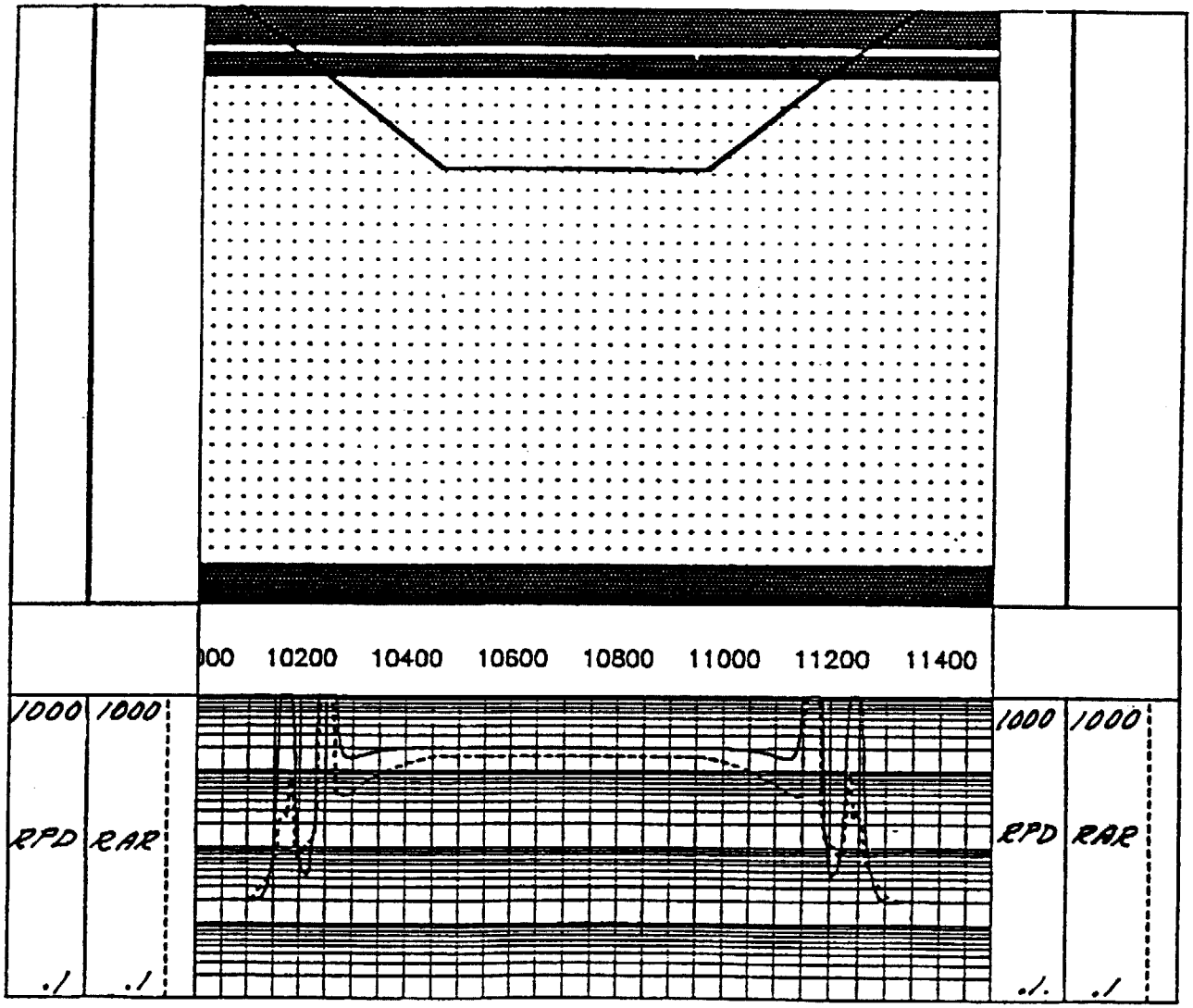
FIG. 8 is a chart of a model of the log of FIG. 7.

In accordance with a second step of this-invention, the log 56 in FIG. 7 is modeled in a dipping bed model (such as the aforementioned model by Huang and Shen). FIG. 8 shows the model response obtained with a one foot sand layer located 3 feet above the 60 foot sand bed. The well enters the pay sand at 87 degrees and leaves the pay sand at 93 degrees. The hole depth offset is arbitrarily chosen. The well path as a function of hole depth is also shown. As mentioned, the model response in FIG. 8 reproduces, at least qualitatively, the log 56 in FIG. 7. The amplitude resistivity under the first phase resistivity horn, according to the model, is measurable, but it is not around 20 ohm-meters which is shown in log 56.

Log 56 (FIG. 7) is essentially symmetrical about an midpoint of 3425 feet measured depth. This phenomenon is due to the fact that this depth corresponds to the deepest stratigraphic penetration into the producing sand. At measured depths below 3435, the well has turned upward (an inclination greater than 90 degrees) and is drilling stratigraphically upwards out of the top of the producing sand. The section below 3435 is compressed with respect to the section above this point due to a greater apparent dip angle between the borehole and the formation. Similar symmetry can be seen in log 46 (FIG. 6), which reaches its deepest stratigraphic penetration at roughly 3600 feet measured depth. Also note the similarity between these actual logs 46, 56 and the modeled log response of FIG. 8.

The model response study shows that the horns, the resistivity drops, and the phase and amplitude resistivity separations in horizontal well logs are due to the bed boundary presence. The three features (resistivity horns, resistivity drops and phase and amplitude resistivity separations) can be used to detect the presence of bed boundaries. The resistivity horns and the phase resistivity drop feature are present in both horizontal well logs 46, 56.

As a bed boundary is detected, this information is passed on to the directional drilling operator who will adjust the drilling parameters to alter the drilling direction and thereby maintain the drillstring within the desired horizontal stratum.

In a second embodiment of this invention, no vertical well is required. Instead, assumptions are made about the resistivities of the vertical strata from other information such as geological knowledge of the area or seismic measurements. These assumed resistivities are used in the aforementioned dipping bed model to generate the modeled log of the substantially horizontal stratum. Thereafter, as in the first embodiment, the electromagnetic propagation resistivity tool is used in the directional well to obtain a real time resistivity log of the substantially horizontal stratum. That log is then compared to the modeled log with the comparison being used to adjust or correct the drilling operations to maintain the drillstring within the desired stratum.

In a third embodiment of this invention, either the actual dipping bed model or a library of the output resistivity logs of the dipping bed model for varying conditions is employed in real time as the well is actually being drilled. The term "library" means a group of previously generated dipping bed model log outputs for various expected downhole conditions (similar to a "look-up" table). As the real time resistivity log is the real time generated model resistivity logs or with the library of modeled resistivity logs. Input parameters to the model or to the library are then modified until the output agrees or matches with the real time resistivity log. At that time the input parameters are assumed to be correct. The input parameters consist of a selected combination of the bed resistivities, the bed thicknesses and the dipping angle. The input parameters from the matched modeled log can be used to assist the drilling operator in maintaining the drillstring within the selected stratum.

While the the preferred embodiments have been shown and described, various modifications an substitutions may be made thereto without departing from the spirit and scope of the invention. Accordingly, it is to be understood that the present invention has been described by way of illustrations and not limitations.

What is claimed is:

1. A method of locating a substantially horizontal bed of interest in a formation and maintaining a drillstring therein during the drilling operation, said drillstring including a measurement-while-drilling (MWD) electromagnetic propagation resistivity sensor, comprising the steps of:

drilling a substantially vertical offset well in a formation having at least one selected substantially horizontal bed therein;

measuring resistivity in the formation at the offset well to provide a first resistivity log as a function of depth;

modeling the substantially horizontal bed to provide a modeled resistivity log indicative of the resistivity taken along the substantially horizontal bed, said modeling being based on said first resistivity log;

drilling a directional well in said formation near said offset well, a portion of said directional well being disposed in said substantially horizontal bed;

measuring resistivity in said directional well using the MWD electromagnetic propagation resistivity sensor to provide a second log of resistivity taken substantially horizontally;

comparing said second log to said modeled log to determine the location of said directional well; and adjusting the directional drilling operation so as to maintain said drillstring within said substantially horizontal bed during the drilling of said directional well in response to said comparing step.

2. The method of claim 1 wherein said second log and said modeled log comprises:

at least one resistivity horn being indicative of a boundary between said bed and an adjacent bed.

3. The method of claim 2 wherein said horn is a phase difference resistivity horn.

4. The method of claim 2 wherein said horn is an amplitude ratio resistivity horn.

5. The method of claim 1 wherein said second log and said modeled log are phase difference resistivity logs.

6. The method of claim 1 wherein said second log and said modeled resistivity log are amplitude ratio resistivity logs.

7. The method of claim 1 wherein said adjusting step further includes:

maintaining said drillstring within the upper portion of said bed during the drilling of said directional well in response to said comparing.

8. A method of locating a substantially horizontal bed of interest in a formation and maintaining a drillstring therein during the drilling operation, said drillstring including a measurement-while-drilling (MWD) electromagnetic propagation resistivity sensor, comprising the steps of:

drilling a substantially vertical offset well in a formation having at least one selected substantially horizontal bed therein;

measuring resistivity in the formation at the well to provide a first resistivity log as a function of depth;

modeling the substantially horizontal bed to provide a modeled resistivity log indicative of the resistivity taken along the substantially horizontal bed, said modeling being based on said first resistivity log;

drilling a substantially horizontal well within said substantially horizontal bed;

measuring resistivity in said horizontal well using the MWD electromagnetic propagation resistivity sensor to provide a second log of resistivity taken substantially horizontally;

comparing said second log to said modeled log to determine the location of said horizontal well; and adjusting the horizontal drilling operation so as to maintain said drillstring within said substantially horizontal bed during the drilling of said well in response to said comparing step.

9. A method of locating a substantially horizontal bed of interest in a formation and maintaining a drillstring therein during the drilling operation, said drillstring including a measurement-while-drilling (MWD) electromagnetic propagation resistivity sensor, comprising the steps of:

generating a first resistivity log for a substantially horizontal bed using assumed resistivity values for a desired course of drilling in a preselected dipping bed model to provide a modeled resistivity log indicative of the resistivity taken along the substantially horizontal bed in a formation;

drilling a directional well in said formation, a portion drilling a directional well in said formation, a portion of said directional well being disposed in said substantially horizontal bed;

measuring resistivity in said directional well using the MWD electromagnetic propagation resistivity sensor to provide a second log of resistivity taken substantially horizontally;

comparing said second log to said modeled first log to determine the location of said directional well; and adjusting the directional drilling operation so as to maintain said drillstring within said substantially horizontal bed during the drilling of said directional well in response to said comparing step.

10. The method of claim 9 wherein said second log and said modeled log comprises:

at least one resistivity horn being indicative of a boundary between said bed and an adjacent bed.

11. The method of claim 10 wherein said horn is a phase difference resistivity horn.

12. The method of claim 10 wherein said horn is an amplitude ratio resistivity horn.

13. The method of claim 9 wherein said second log and said modeled log are phase difference resistivity logs.

14. The method of claim 9 wherein said second log and said modeled resistivity log are amplitude ratio resistivity logs.

15. The method of claim 9 wherein said adjusting step further includes:

maintaining said drillstring within the upper portion of said bed during the drilling of said directional well in response to said comparing.

16. A method of locating a substantially horizontal bed of interest in a formation and maintaining a drillstring therein during the drilling operation, said drillstring including a measurement-while-drilling (MWD) electromagnetic propagation resistivity sensor, comprising the steps of:

generating a group of dipping bed model logs for various expected downhole conditions;

drilling a directional well in a formation, a portion of said directional well being disposed in a substantially horizontal bed;

measuring resistivity in said directional well using the MWD electromagnetic propagation resistivity sensor to provide a real time log of resistivity taken substantially horizontally;

comparing said real time log to at least one of the model logs in said group of dipping bed model logs until one of said model logs substantially matches said real time log defining a matched model log;

using input parameters from said matched model log to determine the location of said directional well; and adjusting the directional drilling operation so as to maintain said drillstring within said substantially horizontal bed during the drilling of said directional well in response to said comparing step.

17. A method of locating a substantially horizontal bed of interest in a formation and maintaining a drillstring therein during the drilling operation, said drillstring including a measurement-while-drilling (MWD) electromagnetic propagation resistivity sensor, comprising the steps of:

drilling a directional well in a formation, a portion of said directional well being disposed in a substantially horizontal bed;

measuring resistivity in said directional well using the MWD electromagnetic propagation resistivity sensor to provide a real time log of resistivity taken substantially horizontally;

generating a model resistivity log from a preselected dipping bed model for a substantially horizontal bed using input values selected so that the model resistivity log will substantially match the real time log defining a matched model log;

using input parameters from said matched model log to determine the location of said directional well; and adjusting the directional drilling operation so as to maintain said drillstring within said substantially horizontal bed during the drilling of said directional well in response to said comparing step.

*18. A method of locating a bed of interest in a formation and maintaining a drillstring therein during the drilling operation, said drillstring including a measurement-while-drilling (MWD) resistivity sensor, comprising the steps of:*

*(1) modeling at least one substantially horizontal bed to provide a modeled resistivity log indicative of the resistivity taken along the substantially horizontal bed, said modeling being based on information related to said substantially horizontal bed;*

*(2) drilling a directional well, a portion of said directional well intended to be disposed in said substantially horizontal bed;*

*(3) measuring resistivity in said directional well using the MWD resistivity sensor to provide a measured log of resistivity; and*

*(4) comparing the measured log to said modeled log to determine the location or position of said directional well with respect to said substantially horizontal bed.*

*19. The method of claim 18 including the step of:*

*adjusting the directional drilling operation so as to maintain said drillstring within said substantially horizontal bed during the drilling of said directional well in response to said comparing step.*

*20. The method of claim 18 wherein:*

*said information is selected from at least one of (a) data from an offset well which intersects with said horizontal bed, (b) seismic data, (c) assumptions of the horizontal bed, and (d) prior geological knowledge of the horizontal bed.*

*21. The method of claim 18 including the steps of:*

*identifying at least one resistivity horn in said measured log; and*

*using said resistivity horn as an indicator of a boundary between said substantially horizontal bed and an adjacent bed.*

*22. The method of claim 21 wherein said comparing step further includes:*

*comparing said measured resistivity horn to said modeled resistivity log to determine the location or position of said directional well.*

*23. The method of claim 21 wherein said horn is a phase difference resistivity horn.*

*24. The method of claim 21 wherein said horn is an amplitude ratio resistivity horn.*

*25. The method of claim 18 wherein said measured log and said modeled log are phase difference resistivity logs.*

*26. The method of claim 18 wherein said measured log and said modeled log are amplitude ratio resistivity logs.*

*27. The method of claim 18 wherein said measured log and said modeled log include both phase difference resistivity logs and amplitude ratio resistivity logs.*

*28. The method of claim 19 wherein said adjusting step further includes:*

*maintaining said drillstring within the upper portion of said bed during the drilling of said directional well.*

*29. The method of claim 18 wherein said measured log includes resistivity from phase difference and resistivity from amplitude ratio and including the steps of:*

*identifying separations between said phase difference and amplitude ratio in said measured log; and*

*using said separations as an indicator of a boundary between said substantially horizontal bed and an adjacent bed.*

*30. The method of claim 18 including the steps of:*

*identifying resistivity drops in said measured log; and*

*using said resistivity drops as an indicator of a boundary between said bed and an adjacent bed.*

*31. The method of claim 18 wherein:*

*said MWD resistivity sensor comprises an electromagnetic propagation resistivity tool.*

*32. The method of claim 18 wherein:*

*said measured log and said modeled log are derived from at least one of phase and amplitude measurements of an electromagnetic propagation resistivity tool.*

*33. The method of claim 18 wherein:*

*said measured log and said modeled log are derived from at least one of phase and amplitude measurements of an electromagnetic propagation resistivity tool.*

*34. A method of locating a bed of interest in a formation and maintaining a drillstring therein during the drilling operation, said drillstring including a measurement-while-drilling (MWD) resistivity sensor, comprising the steps of:*

*measuring resistivity in the formation at an offset well to provide a first resistivity log as a function of depth, the offset well having at least one selected substantially horizontal bed therein;*

*modeling the substantially horizontal bed to provide a modeled resistivity log indicative of the resistivity taken along the substantially horizontal bed, said modeling being based on said first resistivity log;*

*drilling a directional well in said formation near said offset well, a portion of said directional well intended to be disposed in said substantially horizontal bed;*

*measuring resistivity in said directional well using the MWD resistivity sensor to provide a second log of resistivity taken substantially horizontally; and*

*comparing said second log to said modeled log to determine the location or position of said directional well with respect to said substantially horizontal bed.*

*35. The method of claim 34 including the step of:*

*adjusting the directional drilling operation so as to maintain said drillstring within said substantially horizontal bed during the drilling of said directional well in response to said comparing step.*

*36. The method of claim 34 wherein said adjusting step further includes:*

*maintaining said drillstring within the upper portion of said bed during the drilling of said horizontal well.*

*37. A method of locating a bed of interest in a formation and maintaining a drillstring therein during the drilling operation, said drillstring including a measurement-while-drilling (MWD) resistivity sensor, comprising the steps of:*

*(1) modeling at least one substantially horizontal bed to provide a modeled resistivity log indicative of the resistivity taken along the substantially horizontal bed, said modeling being based on information related to said substantially horizontal bed;*

*(2) drilling a substantially horizontal well within said substantially horizontal bed, a portion of said horizontal well intended to be disposed in said substantially horizontal bed;*

*(3) measuring resistivity in said horizontal well using the MWD resistivity sensor to provide a measured log of resistivity taken substantially horizontally; and*

*(4) comparing the measured log to said modeled log to determine the location or position of said horizontal well with respect to said substantially horizontal bed.*

*38. The method of claim 37 including the step of:*

*adjusting the directional drilling operation so as to maintain said drillstring within said substantially horizontal bed during the drilling of said horizontal well in response to said comparing step.*

*39. The method of claim 37 wherein:*

*said information is selected from at least one of (a) data from an offset well which bed, and (d) prior geological knowledge of the horizontal bed.*

*40. The method of claim 37 including the steps of:*

*identifying at least one resistivity horn in said measured log; and*

*using said resistivity horn as an indicator of a boundary between said substantially horizontal bed and an adjacent bed.*

*41. The method of claim 40 wherein said comparing step further includes:*

*comparing said measured resistivity horn to said modeled resistivity log to determine the location or position of said directional well.*

*42. The method of claim 40 wherein said horn is a phase difference resistivity horn.*

*43. The method of claim 40 wherein said horn is an amplitude ratio resistivity horn.*

*44. The method of claim 37 wherein said measured log and said modeled log are phase difference resistivity logs.*

45. The method of claim 37 wherein said measured log and said modeled log are amplitude ratio resistivity logs.

46. The method of claim 37 wherein said measured log and said modeled log include both phase difference resistivity logs and amplitude ratio resistivity logs.

47. The method of claim 37 wherein said measured log includes resistivity from phase difference and resistivity from amplitude ratio and including the steps of:

identifying separations between said phase difference and amplitude ratio in said measured log; and using said separations as an indicator of a boundary between said bed and an adjacent bed.

48. The method of claim 37 including steps of:

identifying resistivity drops in said measured log; and using said resistivity drops as an indicator of a boundary between said bed and an adjacent bed.

49. A method of locating a substantially horizontal bed of interest in a formation and maintaining a drillstring therein during the drilling operation, said drillstring including a measurement-while-drilling (MWD) resistivity sensor, comprising the steps of:

generating a modeled resistivity log for a substantially horizontal bed using assumed resistivity values for a desired course of drilling from a preselected dipping bed model, said modeled resistivity log being indicative of the resistivity taken along the substantially horizontal bed in a formation;

drilling a directional well in said formation, a portion of said directional well intended to be disposed in said substantially horizontal bed;

measuring resistivity in said directional well using the MWD resistivity sensor to provide a log of resistivity taken substantially horizontally; and comparing said measured log to said modeled log to determine the location or position of said directional well with respect to said substantially horizontal bed.

50. The method of claim 49 including the steps of:

adjusting the directional drilling operation so as to maintain said drillstring within said substantially horizontal bed during the drilling of said directional well in response to said comparing step.

51. A method of locating a substantially horizontal bed of interest in a formation and maintaining a drillstring therein during the drilling operation, said drillstring including a measurement-while-drilling (MWD) resistivity sensor, comprising the steps of:

generating a group of dipping bed model logs for various expected downhole conditions;

drilling a directional well in a formation, a portion of said directional well intended to be disposed in a substantially horizontal bed;

measuring resistivity in said directional well using the MWD resistivity sensor to provide a real time log of resistivity taken substantially horizontally;

comparing said real time log to at least one of the model logs in said group of dipping bed model logs until one of said model logs substantially matches said real time log defining a matched model log; and using input parameters from said matched model log to determine the location or position of said directional well with respect to said substantially horizontal bed.

52. The method of claim 51 including the step of:

adjusting the directional drilling operation so as to maintain said drillstring within said substantially horizontal bed during the drilling of said directional well in response to said comparing step.

53. A method of locating a substantially horizontal bed of interest in a formation and maintaining a drillstring therein during the drilling operation, said drillstring including a measurement-while-drilling (MWD) resistivity sensor, comprising the steps of:

drilling a directional well in a formation, a portion of said directional well being disposed in a substantially horizontal bed;

measuring resistivity in said directional well using the MWD resistivity sensor to provide a real time log of resistivity taken substantially horizontally;

generating a model resistivity log from a preselected dipping bed model for a substantially horizontal bed using input values selected so that the model resistivity log will substantially match the real time log defining a matched model log; and using input parameters from said matched model log to determine the location or position of said directional well with respect to said substantially horizontal bed.

54. The method of claim 53 including the step of:

adjusting the directional drilling operation so as to maintain said drillstring within said substantially horizontal bed during the drilling of said directional well in response to said comparing step.

55. For use in connection with an earth borehole drilling apparatus that includes a drilling rig, a drillstring operating from said drilling rig for drilling an earth borehole, said drillstring including a bottom hole arrangement comprising a drill bit, a downhole resistivity measuring subsystem for measuring downhole formation resistivity near said bit by propagating electromagnetic energy into earth formations near said bit, receiving electromagnetic energy that has propagated through the formations and producing measurement signals that depend on the received signals; a method for directing the drilling of a well bore with respect to a geological bed boundary in said earth formations, comprising the steps of:

producing from said measurement signals a recording of downhole formation resistivity as a function of borehole depth, said formation resistivity being in the form of a log depicting phase difference and amplitude ratio;

identifying separations between said phase difference and amplitude ratio in said log; and implementing a change in the drilling direction of said drill bit in response to said identification of any separations between said phase difference and amplitude ratio.

56. For use in conjunction with an earth borehole directional drilling apparatus that includes a drilling rig, a drillstring operating from said drilling rig for drilling an earth borehole, said drillstring including a bottom hole arrangement comprising a drill bit, a downhole resistivity measuring subsystem for measuring downhole earth formation resistivity near said bit by propagating electromagnetic energy into earth formations near said bit, receiving electromagnetic energy that has propagated through the formations and producing measurement signals that depend on the received signals and downhole telemetry means for transmitting the measurement signals; wherein said apparatus has initiated drilling a well bore within a first geological bed in said formations and approximately adjacent a geological bed boundary between said first bed and a second geological bed in said formations; a method for maintaining drilling of the well bore in said first bed, comprising the steps of:

*deriving from said measurement signals, downhole formation resistivity, said formation resistivity being in the form of a log depicting phase difference and amplitude ratio;*

*monitoring said resistivity, as a function of the borehole depth of the drill bit position;*

*identifying separations between said phase difference and amplitude ratio in said log; and*

*implementing changes in the drilling direction of said drill bit in response to the identification of any separations between said phase difference and amplitude ratio.*

*57. For use in conjunction with an earth borehole drilling apparatus that includes a drilling rig, a drillstring operating from said drilling rig for drilling an earth borehole, said drillstring including a bottom hole arrangement comprising a drill bit, a downhole resistivity measuring subsystem for measuring downhole formation resistivity near said bit, receiving electromagnetic energy that has propagated through the formations and producing measurement signal that depend on the received signals;*

*a method for directing the drilling of a well bore with respect to a geological bed boundary in said earth formations, comprising the steps of:*

*producing from said measurement signals a recording of downhole formation resistivity as a function of borehole depth;*

*identifying resistivity drops in said resistivity recording; and*

*implementing a change in the drilling direction of said drill bit in response to said identification of any resistivity drops.*

*58. For use in conjunction with an earth borehole directional drilling apparatus that includes a drilling rig, a drillstring operating from said drilling rig for drilling an earth borehole, said drillstring including a bottom hole arrangement comprising a drill bit, a downhole resistivity measuring subsystem for measuring downhole earth formation resistivity near said bit by propagating electromagnetic energy into earth formations near said bit, receiving electromagnetic energy that has propagated through the formations and producing measurement signals that depend on the received signals, and downhole telemetry means for transmitting the measurement signals uphole and uphole telemetry means for receiving the measurement signals; wherein said apparatus has initiated drilling a well bore with a first geological bed in said formations and approximately adjacent a geological bed boundary between said first bed and a second geological bed in said formations; a method for maintaining drilling of the well bore ins aid first bed, comprising the steps of:*

*deriving from said measurement signals, downhole formation resistivity;*

*monitoring said resistivity as a function of the borehole depth of the drill bit position to detect any resistivity drops; and*

*implementing changes in the drilling direction of said drill bit in response to the detection of any resistivity drops.*

*59. A method of locating a bed of interest in a formation and maintaining a drillstring therein during the drilling operation, said drillstring including a measurement-while-drilling (MWD) sensor, comprising the steps of:*

*(1) modeling at least one substantially horizontal bed to provide a modeled log of a set of parameters indicative of the response taken as the MWD sensor traverses or moves within the bed, said modeling being based on information related to said substantially horizontal bed and the path of the MWD sensor;*

*(2) drilling a directional well, a portion of said directional well intended to be disposed in said substantially horizontal bed;*

*(3) measuring and recording MWD sensor output parameters indicative of the formation parameters in said directional well using the MWD sensor to provide a measured log of said output parameters; and*

*(4) comparing the measured log to said modeled log to determine the location or position of said directional well with respect to said substantially horizontal bed.*

*60. The method of claim 59 including the step of:*

*adjusting the directional drilling operation so as to maintain said drillstring within said substantially horizontal bed during the drilling of said directional well in response to said comparing step.*

*61. The method of claim 59 wherein:*

*said information is selected from at least one of (a) data from an offset well which intersects with said horizontal bed, (b) seismic data, (c) assumptions of the horizontal bed, and (d) prior geological knowledge of the horizontal bed.*

* * * * *